United States Patent
Selitser et al.

(10) Patent No.: US 9,553,944 B2
(45) Date of Patent: Jan. 24, 2017

(54) APPLICATION SERVER PLATFORM FOR TELECOM-BASED APPLICATIONS USING AN ACTOR CONTAINER

(75) Inventors: Boris Selitser, Castro Valley, CA (US); Anders Lars-Goran Forsberg, Karlstad (SE); Jean Bovet, Los Angeles, CA (US); Andreas Jansson, San Francisco, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1034 days.

(21) Appl. No.: 13/339,252

(22) Filed: Dec. 28, 2011

(65) Prior Publication Data

US 2012/0173715 A1   Jul. 5, 2012

Related U.S. Application Data

(60) Provisional application No. 61/428,129, filed on Dec. 29, 2010, provisional application No. 61/432,554, filed on Jan. 13, 2011.

(51) Int. Cl.
*G06F 15/16* (2006.01)
*H04L 29/08* (2006.01)

(52) U.S. Cl.
CPC ................................. *H04L 67/2809* (2013.01)

(58) Field of Classification Search
CPC ................................................. H04L 67/2809
USPC ................................................. 709/201, 203
See application file for complete search history.

(56) References Cited

U.S. PATENT DOCUMENTS

| | | | |
|---|---|---|---|
| 5,961,601 A | 10/1999 | Iyengar | |
| 7,139,821 B1 * | 11/2006 | Shah et al. | 709/224 |
| 7,593,980 B2 | 9/2009 | Marascio et al. | |
| 2003/0046395 A1 | 3/2003 | Fleming et al. | |
| 2003/0191679 A1 | 10/2003 | Casati et al. | |
| 2006/0074805 A1 * | 4/2006 | Svendsen et al. | 705/44 |
| 2006/0294417 A1 | 12/2006 | Awasthi et al. | |
| 2007/0240166 A1 | 10/2007 | Marappan | |
| 2007/0294577 A1 * | 12/2007 | Fiske | 714/13 |
| 2008/0282205 A1 * | 11/2008 | Dykstra-Erickson | G06F 9/4443 715/866 |
| 2009/0260021 A1 * | 10/2009 | Haenel et al. | 719/328 |
| 2009/0327929 A1 * | 12/2009 | McCoy | 715/763 |
| 2010/0017503 A1 * | 1/2010 | Kim et al. | 709/219 |
| 2011/0029812 A1 | 2/2011 | Lu et al. | |
| 2011/0252127 A1 | 10/2011 | Iyengar et al. | |
| 2011/0302570 A1 * | 12/2011 | Kurimilla et al. | 717/170 |

* cited by examiner

*Primary Examiner* — Jason Recek
(74) *Attorney, Agent, or Firm* — Tucker Ellis LLP

(57) ABSTRACT

In accordance with various embodiments, a set of features are described for enabling an application server platform for telecom based applications. A system for providing an application server for telecom-based applications can include a computer, including a computer readable medium and processor. The system can also include an application server, executing on the computer. The application server can include an actor container that manages and provides lifecycle and runtime properties for application classes that are executed as actors in the application server. The actor container can manages a set of event transactions, wherein all storage operations are performed as part of the event transaction that spans each event handler invocation.

20 Claims, 6 Drawing Sheets

US 9,553,944 B2

APPLICATION SERVER PLATFORM FOR TELECOM-BASED APPLICATIONS USING AN ACTOR CONTAINER

CLAIM OF PRIORITY

This application claims the benefit of priority to U.S. Provisional Patent Application No. 61/428,129, titled "IMPROVED APPLICATION SERVER PLATFORM FOR TELECOM-BASED APPLICATIONS", filed on Dec. 29, 2010; and U.S. Provisional Patent Application No. 61/432,554, titled "APPLICATION SERVER PLATFORM HAVING A DEPLOYMENT MANAGEMENT SERVICE, CONFIGURATION SERVICE, TCAP ADAPTER, SIP ADAPTER AND A JAVA MEDIA SERVER CONTROLLER", filed on Jan. 13, 2011; each of which applications are herein incorporated by reference.

CROSS REFERENCE TO RELATED APPLICATIONS

The present application is related to U.S. patent application Ser. No. 13/339,287, titled "AN EVENT BROKER FOR AN IMPROVED APPLICATION SERVER PLATFORM FOR TELECOM-BASED APPLICATIONS", filed on Dec. 28, 2011, and now U.S. Pat. No. 8,788,580; and U.S. patent application Ser. No. 13/339,300, titled "IMPROVED APPLICATION SERVER PLATFORM FOR TELECOM-BASED APPLICATIONS HAVING A TCAP ADAPTER, SIP ADAPTER AND ACTOR PROTOCOL CONTEXT", filed on Dec. 28, 2011; each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The current invention relates to mobile communications and in particular to providing application server platform for applications that utilize telecom-based functionality.

BACKGROUND

In today's world of telecommunications, more and more devices and functionalities are being integrated with one another in order to create new features and capabilities for the everyday user, as well as for large organizations and enterprises. Numerous examples of this can be seen in the realms of mobile devices, cellular phones and computers. Everything from electronic mail, internet access, text messaging, video and digital photography to video games, social networking and other forms entertainment, are becoming available for a wide variety of mobile devices. Countless web applications now provide services that can access or be accessed via mobile phone to enable a particular feature.

Given all of this pervasiveness, the management of software applications must expand in order to accommodate a multitude of mediums and modes of operation previously unconsidered by most developers. As a simple illustration, in order to allow an internet user of a web application to set up a conference telephone call between several end subscribers, the application must be able to interact in some meaningful way with multiple and substantially different protocols and networks. This is the general environment within which embodiments of the invention are intended to be used.

SUMMARY

In accordance with various embodiments, a set of features are described for enabling an application server platform for telecom based applications. A system for providing an application server for telecom-based applications can include a computer, including a computer readable medium and processor. The system can also include an application server, executing on the computer. The application server can include an actor container that manages and provides lifecycle and runtime properties for application classes that are executed as actors in the application server. The actor container can manages a set of event transactions, wherein all storage operations are performed as part of the event transaction that spans each event handler invocation.

DETAILED DESCRIPTION

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

In accordance with various embodiments, a set of features are described for enabling an application server platform for telecom based applications. The application server provides a protocol-neutral programming model for application developers. Rather than having to account for specific protocol entry points into the server, all interactions in the server are abstracted as asynchronous events through the event broker layer. State management and concurrency are implemented as an actor-based model, where each actor owns its own segment of state and other actors wishing to update that state send asynchronous events to the owner. This architecture allows multiple protocols to be consumed in one process, allow applications sessions to span multiple environments and protocols, and allows the programming model to be decoupled from any particular protocol entry point.

GLOSSARY

Figure 1:
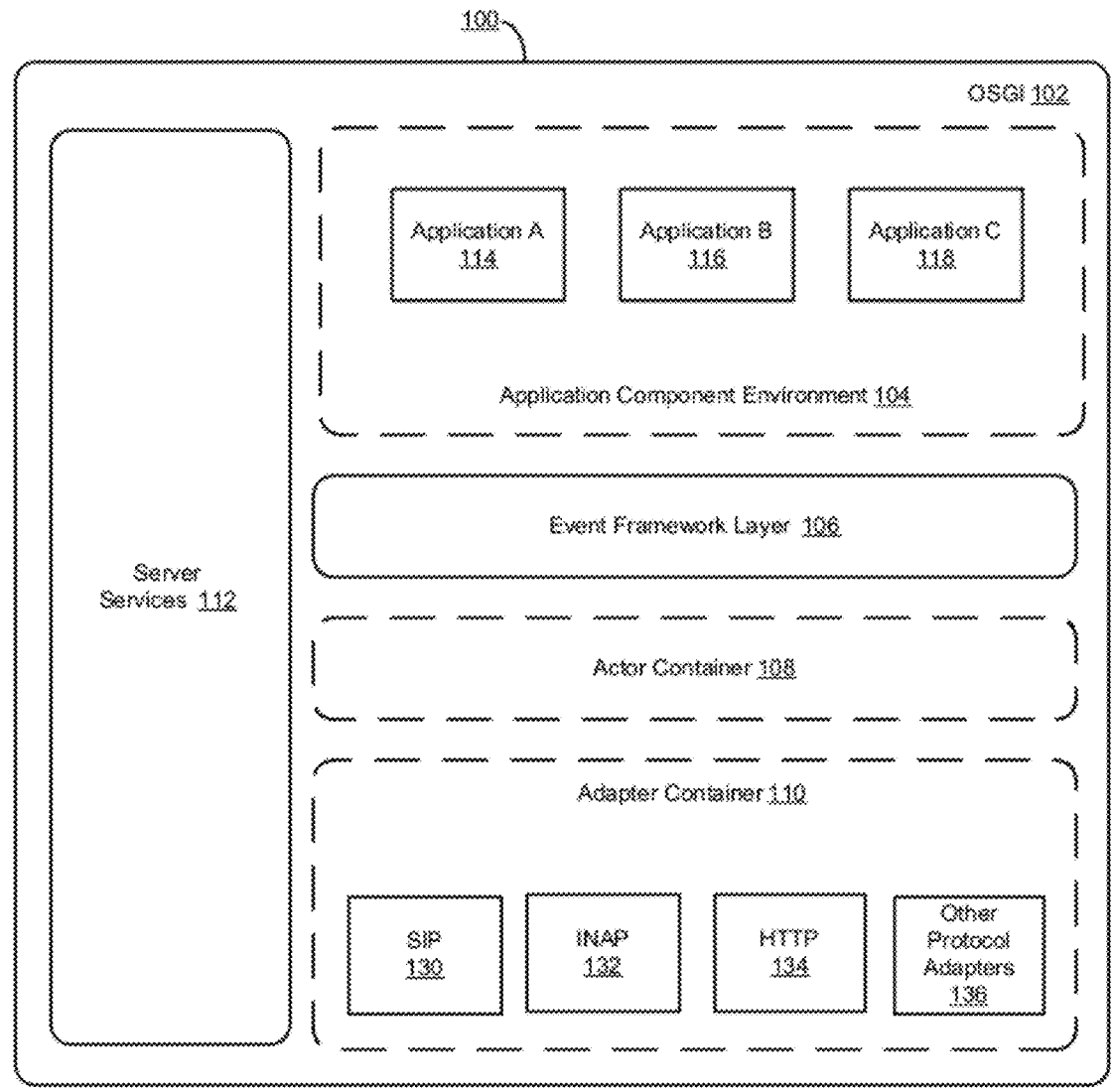
FIG. 1 is a functional illustration of an application server, in accordance with various embodiments of the invention.

In accordance with an embodiment, the following terms as used herein are defined below:
Actor: An entity in the Actor Mode, with runtime properties provided by the Actor Container.
Actor Container: Set of bundles and function responsible for providing APIs and runtime environment for actor based applications.
Actor Framework: Usually a synonym of Actor Container.
Actor Factory: Factory used to request creation of other actors.
Actor Links: Hint that an actor being created is linked to the creator and that optimizations on communication with it would be greatly beneficial.
Actor Model: Mathematical model representing an event based actor programming model through use of the actor container.
Actor Store: Actor specific store with isolated view of data written by this actor; see also Storage Service.
APE: See Actor Protocol Extension.
Actor Protocol Extension: Protocol adapter extension to actors that send and/or receive events from mentioned Protocol adapter.
Bundle: OSGi bundle, deployment artifact consisting of jar file with OSGi specific manifest properties.
Coherence: Oracle Coherence.
Declarative Services: OSGi compendium specification for OSGi service dependency definition and injection.
Event Broker: System feature for managing events.
Event Channel: An abstraction for application events sent from many to one subscribing actor over typed event channels; also the client side interface used to publish such events.
Event Channel Factory: Factory used to create event channel ports and open/subscribe handlers to event channels.
Event Channel Port: Template that can be used to reserve a channel of a specified type to be opened at a later time, possibly by another actor.
Event Channel Session: Session representing an open channel; this is used to later close and unsubscribe from the channel.
Falcon: A particular embodiment of the event based platform developed for OCCAS.
OCCAS: Oracle Communications Converged Application Server, a product family that includes a SIP server.
OSGi: A set of service platform and framework specifications.
Protocol Extension: See Actor Protocol Extension.
Storage Service: feature managing cluster storage.
FIG. 1 is a functional illustration of an application server, in accordance with various embodiments of the invention. Although FIG. 1 depicts components as logically separate, such depiction is merely for illustrative purposes, and the components illustrated therein can otherwise be combined or divided into separate software, firmware and/or hardware. Furthermore, such components, regardless of how they are combined or divided, can execute on the same computing device or can be distributed among different computing devices connected by one or more networks or other suitable communication means.

As illustrated in FIG. 1, in accordance with an embodiment, the application server 100 can include an OSGI kernel 102, an application component environment 104, an event framework layer 106, an actor container 108, an adapter container 110, and a selection of server services 112.

The OSGI kernel provides lifecycle management, class loading, dependency resolution and deployment features for the application components on the server. In accordance with an embodiment, the application components, such as applications 114, 116, 118, can be basic OSGI bundles deployed on the server.

The event framework layer provides an event-based communication model between the application component environment and the adapter container. In particular, the framework layer provides an event broker that maps all protocol-specific communications exposed by the various protocol adapters 130, 132, 134, 136 into asynchronous events, which can be consumed by the application components. Additionally, the application components can produce asynchronous events for propagation to the protocol adapters via the event broker.

The protocol adapters 130, 132, 134, 136 enable the application server to support multiple protocols. In accordance with an embodiment, each of a plurality of various protocols, such as a session initiation protocol (SIP) 130, an intelligent network application part (INAP) of the SS7 protocol 132, a hypertext transfer protocol (HTTP) 134, or many other protocols 136, can have their own adapter. These protocol adapters then interface with the adapter container, the event framework, the actor container and the server services. The adapter container can expose a service provider interface, for use in building new protocol adapters as new protocols emerge or become more widely used.

In accordance with an embodiment, the event framework layer is used to communicate with application components. With respect to the event model, the protocol adapters are consumers and producers of asynchronous events. The SPI interfaces implemented by protocol adapters reflect the complexity relative to application components. Primarily, adapters implement efficient input and output operations (I/O) towards a specific protocol. In addition, protocol-specific security, error handling, and abstraction can be encapsulated in adapters. The adapter container is designed to support a contract in which it cooperates with the adapters to provide connectivity to the network by the application components.

The server services act as basic building blocks for the rest of the functionality implemented on the application server. In accordance with an embodiment, these services are protocol neutral, reusable, and shared by the other layers of the stack. The set of services illustrated in FIG. 1 is not intended to be limiting or exhaustive, and is instead being provided for purposes of illustration. In accordance with an embodiment, various server services can be implemented as needed to address the particular needs of an application developer. For example, a clustering service can be used to maintain cluster membership/replication, while an SLA management service can be used to keep track of service level agreement (SLA) enforcement.

Actor Container

In accordance with various embodiments, the application server platform includes an actor container that manages and provides lifecycle and runtime properties for the actors in the actor model environment of the application server. The actor container exports a number of application programming interfaces (APIs), which enable applications to have classes run as actors in this environment.

In accordance with an embodiment, the Actor Container runs as an OSGI bundle and provides a plurality of aspects to applications that are written and deployed as actors, including single-threaded event processing, isolated storage views, event transactions and store collocation.

For single threaded event processing, the Actor Container ensures that at most one thread invokes an actor's methods at any time. This means that the actor code can be simplified to assume single threading. Note that threads can be pooled, and that there need not be one thread dedicated for each actor.

The actor container provides and manages event transactions. All storage operations can be performed as part of a transaction that spans each event handler invocation. The entire transaction commits or rolls back only after the event processing completes or fails.

The actor container also implements store collocation and actor isolation. For example, the actor instance can be collocated on the same server as its store data. This reduces the amount of network traffic required to manage the store data while still being distributed and redundant. The actors can also be isolated, meaning that only the owning actor can access the actor's store data. This also means that, in some instances, at most one thread can access the actor's stores at any time.

In accordance with an embodiment, the actor container provides the ability to migrate programmable units (actors), including timer migration. While generally, actors execute on a single server in the cluster at any given time, the actor container also provides the ability to migrate actors to another machine (e.g. if a server crashes or an additional server joins the cluster). The actor store data is still available to the actor even in the event that it migrates to another cluster server.

In accordance with an embodiment, the actor container can also enable linked actors. This can be used to provide distributed environment optimization of closely related and/or communicating actors. Actors can be created programmatically using an interface such as ActorFactory. The actor can be created anywhere in the cluster, or a hint can be provided that the container should attempt to link this actor with the actor that requests it to be created. This hint can be given when an application knows that the creating actor and the created actor are closely related, will communicate frequently with each other and would benefit greatly from optimizations on these communications.

Figure 2:
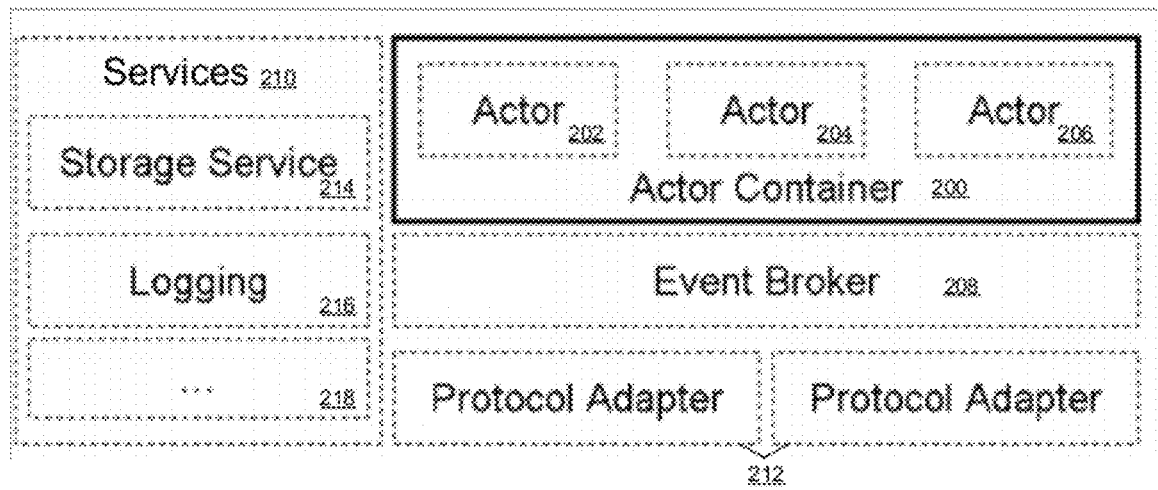
FIG. 2 is an illustration of the actor container, in accordance with various embodiments of the invention.

FIG. 2 is an illustration of the actor container, in accordance with various embodiments of the invention. As illustrated in FIG. 2, the actor container 200 acts as the runtime environment for actors 202, 204, 206, and resides above the event broker 208 and one or more protocol adapters 212. The actor container interfaces with services 210 such as the storage service 212, logging 214, data management processes and other services 216. The actor container provides the runtime environment and API interfaces for application code, that gives application classes and the services exposed through the APIs in its context runtime properties associated with the actor model.

Actor Management

As noted above, the runtime management of actors is provided by the actor container. In accordance with an embodiment, the actor container can include a plurality of OSGi bundles that register an actor container service that can be used by applications to create actors running within this container.

Application Boundary

As shown in FIG. 2, and as viewed from the actor container, an application is defined as an OSGi bundle that implements actor classes and request creation of such actors instances using the actor container. If such an OSGi bundle imports classes from other bundles, the imported classes are considered to belong to the importing application, from the containers point of view.

Additionally, the actor container can maintain separate runtime environments for different applications. The container can define the application boundaries by using the name of the bundle that requests initial actor(s) to be created, and maintaining separate actor manager instances for each such bundle. This way the actor container can provide isolation between different applications, and recognize when the same application is starting on another server in the cluster.

Figure 3:
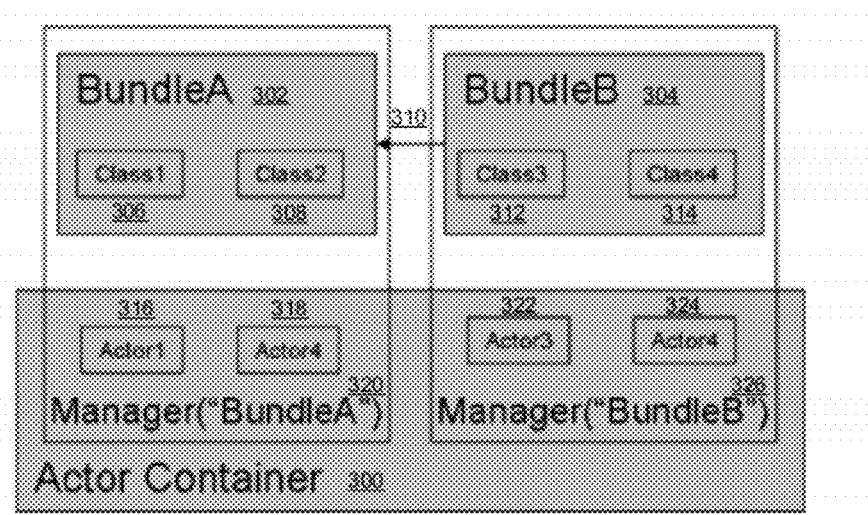
FIG. 3 shows an illustration of application bundles, in accordance with an embodiment.

FIG. 3 shows an illustration of application bundles, in accordance with an embodiment. Additionally, Listing 1 describes the example shown in FIG. 3. As shown in FIG. 3, an actor container 300 can manage multiple application bundles, BundleA 302 and BundleB 304.

As shown in FIG. 3, where there are two application bundles, one of these applications can import one or more classes from the second bundle, and these imported classes can be used to declare an actor to be created in both of these application bundles. For example, Actor4, corresponding to Class4, is created by both BundleA and BundleB. In this case, the actor container will see these as two applications, even though the second bundle uses the same classes as the first bundle.

Listing 1

BundleA 302 is one application bundle
    BundleA includes Class 1 306 and Class 2 308
    BundleA imports 310 Class 3 312 and Class 4 314 from BundleB
    BundleA creates two actors Actor1 316 (of Class 1) and Actor4 318 (of Class 4)
    BundleA actors are managed by actor manager "BundleA" 320
BundleB 304 is another application bundle
    BundleB includes Class 3 and Class 4
    BundleB creates two actors ActorS 322 (of Class 3) and Actor4 324 (of Class 4)
    BundleB actors are managed by actor manager "BundleB" 326

Actor Description

In accordance with an embodiment, the actor container provides a runtime environment and API interfaces for application code, that gives application classes and the services exposed through the APIs in its context runtime properties associated with the actor model.

The runtime properties defined as actor model properties by the OCCAS actor container can include, but are not limited to, one or more properties, as described herein. For example, the runtime properties can include that any code classified as actor code is executed by at most one thread at a time (single-threaded), and that any method invoked on actor code (lifecycle and event handlers), which is bracketed in a transaction. Additionally, the actor can run on one server in the cluster at any time, but may move between servers during its life, e.g. if a server crashes (failover) or an additional server joins the cluster (migration). Further, the actor can have its own isolated view of the storage service, i.e. it can not access other actors store data, and the actor code is collocated on the same server as all actor store data it reads and writes. The actor store data can be made available to the actor even if it fails over or migrates to another cluster server.

In accordance with an embodiment, in order for the application classes to be classified as actor classes, and thereby gain the above-mentioned actor runtime properties, they must satisfy at least one condition. These conditions can include that the class implements the Actor interface and is instantiated by the actor container and only referenced by the container; that the class implements the EventHandler interface and referenced only by the actor or event registrations done by the actor that instantiated the handler; and/or that the class is instantiated AND referenced only by the instantiating actor.

In accordance with an embodiment, in order to break the above rules, a class must either have an explicit staticcode, or register its object reference in a staticfield shared between classes. No such references are exposed through the actor container.

In accordance with an embodiment, communication between different actors and protocol adapters can be performed using events (using ActorEventBroker for timers and protocol events or EventChannel for actor-to-actor events). Although there is no protection from actors invoking Java methods on classes outside of the actor, this approach should be avoided since it would introduce multi threading in that class, and potentially introduce concurrent access errors and deadlock risks to the actor code.

As long as the actor rules are satisfied, all actor code paths, including life-cycle methods and event handlers participate in the single threaded guarantee of the actor. Therefore, all methods of the Actor interface and EventHandlers that the actor registers through interfaces from the ActorContext are called from a single threaded actor scheduler. However, if the actor rules are broken (i.e., not satisfied), then the single-threading guarantee may not apply. For example if an actor class invokes methods on other actors by obtaining references to them through singleton or other registry references, the referenced code could get executed in different threads.

Although it is highly recommended to avoid sharing objects between different actors, this can be done as long as the shared object classes are guaranteed to be thread-safe, and it is guaranteed that no deadlocks can happen.

Declaring Initial Actors

In accordance with an embodiment, to bootstrap into the actor container, an application can declare that it expects the container to create its initial actor(s). This can be done by adding an actor.xml file in the application's bundle jar.

The application can define a set of statically declared initial actors that the application needs to bootstrap into the actor container. Note that the declared actors are instantiated once per application throughout the cluster, i.e. there will not be one copy of the actor per server. The first application instance to start in the cluster will have the declared initial actors created. If additional servers start, there will be no new instances created, since they already exist. Once the initial actors have started, these initial actors are responsible for programmatic creation of any dynamically allocated actors the application uses to operate. The initial actors will in most cases register for a subset of protocol events that in some way or another leads to programmatic creation of other actors, as described in the following sections.

Programmatic Actor Creation

In accordance with an embodiment, once the application has bootstrapped into the actor container, it can perform programmatic creation of new actors. Actors can be created programmatically created using the ActorFactory interface. The actor can be requested to be created anywhere in the cluster, or a hint can be given that the container should attempt to link this actor with the actor that requests it to be created. This hint is given when an application knows that the creating actor and the created actor are closely related, will communicate frequently with each other, and/or would benefit greatly from optimizations on this communication.

In accordance with an embodiment, all actors are assigned a container-internal unique actor identifier that is used to e.g. isolate store state, collocation of state and/or linked actors and correlating log entries relating to actor instances. The identifier is generated at the time of creation, and can be generated using java.util.UUID. This identifier is not known by the actor itself, it is only used by the container.

Life Cycle

As described above, lifecycle transitions are requested through the actor container, and controlled by the container. The startup lifecycle path is requested by creating an actor as described above, and shutdown is either requested by the actor itself, or originated by the container as part of default failure handling, the application owning a set of actors being undeployed or the last server in the cluster being shut down.

In accordance with an embodiment, Actor initiated shutdown of an actor is requested by the actor itself by invoking shutdown on its ActorControl interface. The actor will be able to process all events currently on the queue before being shut down, unless it times out while doing so, in which case it will be force suspended and stopped. No new events will be accepted on the queue after the actor has transitioned into the suspended state.

An important aspect of the actor life-cycle is that the actor can be instantiated and started on any server in the cluster, regardless of on which server the actor creation request was performed. Additionally the container can, after actor activation, decide to migrate the actor to another member in the cluster, normally as a reaction to a server leaving or joining the cluster, in which case the migration life-cycle path will take effect.

In accordance with an embodiment, actors are not allowed to perform actions to the outside world (e.g. publish events, register/unregister handlers, schedule/cancel timers or create child actors) until it reaches starting state (i.e. after start method begins to execute) or after stopping state (i.e. after returning from the stop method). The actor may have a choice to defer suspend unless the suspend is forced by the container. This can be done by invoking defer( ) on the Suspend Request parameter passed to the suspend method, and if the defer method returns true, the Actors suspend method will be invoked at a later point. If the container is force suspending the actor, e.g. after timing out doing deferred suspends, it will not allow further deferral, in which case an attempt to call the defer method will return false, and the container will continue with invoking stop( ) once the suspend method returns. If the actor returns from the suspend method without calling the defer( ) method, the container will proceed to stopping the actor.

In accordance with an embodiment, the actor will never receive events before the actor enters Running state (after actor returns from the resume method) or after entering Suspended state (after actor returns without requesting deferral from the suspend method). Listing 2 shows an exemplary lifecycle. If a lifecycle method or event processing for some reason ends up in an unhandled exception back to the container, it will progress with shutting down the actor starting with the next shutdown sequence state, given the state it was when the exception was caught. Once the stop method returns, the container will remove all state and resources associated with the actor, including actor store data, event registrations, channels and timers.

---
Listing 2
---

Starting: Cleanup only, no Actor method invoked.
Resuming: Stop –>.
Running (unhandled event processing exception): ForceSuspend? –> Stop –>.
Migrating: ForceSuspend? –> Stop –>.
Reviving: ForceSuspend? –> Stop –>.
Suspending: Stop –>.
Suspending: Stop –>.
ForceSuspending?: Stop –>.
Stop: Cleanup only, no additional Actor method invoked.

Lifecycle Transitions

In accordance with an embodiment, the lifecycle of an actor follows the following transition sequences shown in Listing 3.

---
Listing 3
---

Creation:. –> (Starting) –> Started –> (Resuming) –> Running
Shutdown: Running –> (Suspending) – > [(ForceSuspending?) –>]
Suspended –> (Stopping) –> Stopped –>.
Migration:
   Source server: Running –> (Migrating) –> Migrated –>.
   Target server:. –> (Reviving) –> Running
Failover:
   Source server: Running –> Server crash
   Target server:. –> (Reviving) –> Running In accordance with an embodiment, the actor is expected to perform particular actions for each phase shown in Listing 3. In the Starting phase, the actor should prepare for management (register MBeans, read configuration, etc.), optionally register error handler (ActorContext.setError Handler( )). Additionally, during this phase, the actor should not register for events and it should not publish events. In the Resuming phase, the actor should prepare to receive events (register event handlers, subscribe to channels, etc.), and the actor may publish events. In the Suspending phase, the actor should stop receiving events (unregister event handlers, cancel timers, shutdown channels, etc.). In the Stopping phase, the actor should stop handling management actions (unregister MBeans, etc.) and clean up any other resources held. In the Migrate phase, which is not invoked on server crash, only when actor moves from live server to another live server, the actor should only clean up any POJO resources it has so they can be garbage collected, and all actor store data should be kept so that it can be revived to the same state on another server in the cluster and continue processing events. Additionally, during this phase the actor should not unregister event handlers, cancel timers, close event channels, or remove its actor store content. In the Revive phase, the actor can optionally re-register error handler (ActorContext.setErrorHandler( )), and the actor should prepare for management (register M Beans, read configuration, etc.). Additionally the actor can associate new handlers with the event registrations (setHandler method), associate new handlers with the event channel ports (set-Handler method), and associate new handlers with the timers (setHandler method).

The lifecycle of actors is one example of actor code that can be complicated and/or repetitive task to implement, and can be simplified for the developer by using utility classes provided with the platform.

Actor Lifecycle Control Java API

In accordance with an embodiment, the Actor Lifecycle control Java API can include one or more features, as described herein. The Actor Lifecycle control API can include an actor interface which is implemented by application classes that marks the class as being an actor. The interface includes a lifecycle method that provides the class with references to the actor context which the actor uses to retrieve actor container services, such as event broker, etc. The Actor Lifecycle control API can also include a SuspendRequest feature, and an ActorContext, which is an actor specific context that provides the actor with instance specific container service references. The actor should use these services rather than looking up server services directly, since only the context services will provide the actor runtime properties such as single-threading, etc. It can also include a CreateActorResult feature, which is a result of a request to create another actor, and an ActorFactory, which is a factory interface for creating other actors.

In accordance with an embodiment, an ActorControl interface is provided and can be used to request the container to shut down the actor. An ActorRegistrationReceipt can provide an event registration receipt, and an ActorTimerReceipt can provide a timer scheduling receipt. A registration state holder interface is provided which can be given to an actor when revived on a new server, so the actor can associate new event handlers with protocol event registrations, timers and event channel session it previously opened.

Additionally, in accordance with an embodiment, an Actor storage interface can be used to provide an actor with access to a reduced interface to the storage service that can be retrieved from the actor store service available from the actor context. The actor stores can exclude parts of the normal Store API (e.g. locking), since they do not provide any added value to the single threaded behavior and isolated view that the actor has.

In accordance with an embodiment, each store retrieved from the actor store service is isolated from other actor's stores. This means that different actors can not exchange data through using the same store, and can not change each others data through the stores. Some of the benefits with this behavior are that actors can not alter with each others' store data. The ownership of store data is clearly defined. Additionally, actor store data can be collocated with its owning actor, without having to collocate all actors of a specific type. Further, each actor does not have to manually "partition" its store data by tracking its own unique identifiers to avoid confusing other actor data with its own.

In accordance with an embodiment, the container will ensure that an actor's store data is collocated on the same server where the actor is executing, in order to optimize and reduce the number of network trips required for accesses to the actors store data. If actor store data migrates to another server in the cluster, e.g. caused by failover due to a crashed server, or rebalancing caused by a new server joining the cluster, the actor instance should also migrate to the same server. Since the actor could migrate from one server to another at any time, the actor is not pinned to the server where it initially was started. It could move to another server in the cluster at any time. Linked actors would normally move together as part of migration of actors, unless the container decides separating the linked actors is necessary for load protection. In accordance with an embodiment, linked actors are likely to be moved together as a group. Rebalancing migration of actors and their state should not impact in-flight traffic. Minimal latency increase for the duration of the migration is likely impossible to avoid, but this should be the only impact allowed.

Storage Java API

In accordance with an embodiment, the Storage Java API can include a plurality of features, as described herein. The Storage Java API can include an ActorStoreService. This service can be used to retrieve references to named and/or typed actor stores. Each retrieved store is isolated to the owning actor instance. Additionally, an ActorStore can be provided, which is a named or typed actor store. The store is isolated to the owning actor instance. Changes made to the store are committed only after the actor returns successfully from a method.

In accordance with an embodiment, when an event arrives to an actor, the container can begin a transaction that spans the execution of the event processing in the actor. The container will collect any state changing and external communication in this transaction and commit these as one if the event processing returns successfully, or discard them all when the actor processing results in an exception to roll back the actor the state it was before the event arrived, and ensure that the actor does not cause other actors to transition to other states as a response to events from this actor. The actions that participate in the transaction can include Actor store operations, Event broker actions (which can include Publish events (both outbound and channel events), Schedule/cancel timers, and Register/unregister event handlers), and Actor creation/shutdown.

Generally, there is no support for having transactions spanning execution in multiple actors. Transactions begin before executing code in an actor method, and commit/abort only the actor's transaction actions after return/exception from said method.

Event Communication

In accordance with an embodiment, actors communicate with other components (such as other actors or protocol adapters) using events published to the event broker through the Actor Container. Event publishing methods are found on the actor context. An actor can not assume that the destination for an event has successfully processed the event unless it receives an explicit acknowledgment from the receiver for said event. This means that if the sending actor must know the outcome of another entity's processing of the event, it should have an explicit "pending" state while waiting for the response, and not until it received the response transition into either "success" or "failed" state (where a timeout could possibly be a reason for transition into "failed" state).

Event Scheduler

In accordance with an embodiment, each actor is associated with its own actor scheduler, which is the component responsible for the single threading guarantee of actors. This event scheduler is used for all event handlers that are registered in the event broker, and ensures that all events that arrive to the actor are enqueued and executed in at most one thread at any given time. The same scheduler is used to enqueue any other operations that end up executing code in the actor, e.g. lifecycle methods, etc.

Protocol Events

Protocol events are sent through the Event Broker using a publish method found on the actor context. Receiving protocol events is accomplished by registering an event handler on a specific criteria in the actor event broker found on the actor context. See event broker for a detailed functionality description, since the actor container more or less mirror the event broker functionality.

Application Event Channels

In accordance with an embodiment, application events can be sent between actors by using channels. There are two ways of creating channels using an event factory retrieved from the actor context:

EventChannel.open(Class, EventHandler)—Creates and opens a channel with a local handler subscribed.

EventChannel.getPort(Class)/EventChannel.open (EventChannelPort, EventHandler)—Creates a channel and either open locally with a local handler subscribed or passport to a child actor as a create actor argument. The child actor must then open the channel to subscribe a local handler to enable publishing events on the channel reference. When the port is forwarded to a child actor, the create method returns a holder interface where channel references can be found and used to publish events to the child actor that subscribes a handler to the port in its resume method.

Both event channel references can be passed to other actors, so that multiple actors can send events to the channel receiver, but there can only be one subscriber to any particular channel. If a port is opened multiple times, each open will lead to different channels being opened. Note that in the case where a child actor opens a port received from a parent, only the first channel opened will be returned to the parent through the holder interface, subsequently opened channels will have to be forwarded manually to any other actor that wants to use it.

In accordance with an embodiment, when an event channel is opened, the open method returns a session object which should be kept so that the actor can close the channel (unsubscribe its handler) when it no longer is interested in events from this channel. Closing the channel will cause any future attempts to publish to the channel to fail. The event channel feature can be considered an abstraction on top of the event broker, which uses application events and application event registrations to register for and publish events.

Timer Events

Timer events are scheduled through the Event Broker using either the one time or recurring schedule method found on the actor context.

Event Java API

In accordance with an embodiment, the Event Java API can include a plurality of features, as described herein. In accordance with an embodiment, the Event Java API can include a PublishEventException, which is an exception indicating that publishing an event failed. The event can be retrieved from the exception.

An ActorEventBroker is provided, which is the actor view of the event broker service. This interface must be used for all protocol events and timers to achieve the single threading guarantee of the actor model.

An EventChannelFactory is also provided, which is a factory that can be used to create event channel ports and open event channels. An EventChannelPort, which represents a template for a channel that will be opened at a later point, typically by another actor as part of the creation process, is also provided. Additionally, an EventChannelSession which represents an open channel subscription can be provided. The event channel session can be used to close and unsubscribe from the channel or associate a new handler with the channel.

In accordance with an embodiment, an event channel is used to publish events to a single subscriber that previously opened the channel using the event channel factory. An event channel holder interface is returned from a create actor request. This interface is used by the creating actor to look up event channels that the created actor has opened, using the port specified by the creating actor as a key.

In accordance with an embodiment, an ActorErrorHandler is provided, which is an error handler that the actor optionally registers with the container in order to receive notifications of errors occurring during the commit phase, i.e. after the actor code has returned. An ActorErrorEvent is an error event optionally received by the actors error handler. The error events can include an ActorEventFailed Event, which is an error event indicating that processing of an event failed. Holds the event that was being processed when the failure occurred. The error events can also include an ActorLifecycleFailedEvent which is an error event indicating that a lifecycle method failed to commit.

In accordance with an embodiment, the Event Java API can also include an Actor Protocol Extension feature. Error handling, via a ProtocolExtension.onActorError, is triggered before any notification to the actor code (if there is a handler registered), and the extension is given a choice to either handle the error and hide it from the actor, or return the same or a new error event to be forwarded to the optional actor error handler. If the extension returns an error and no actor error handler is registered, the default error handling will be performed by the container.

A protocol extension lifecycle similar to the actors lifecycle can be provided, wherein the extensions lifecycle methods are invoked before the actors on starting path and after on stopping path. The suspend method allows the extension to perform processing before giving an asynchronous response back to the container to indicate that it is ready for transition into the suspended state. If the extension does not respond that it completed suspending within a reasonable time, the suspending state will timeout and the extension is invoked to force suspend and then stop.

APE Java API

In accordance with an embodiment, the APE Java API can include a plurality of features, as described herein. The APE API can include a ProtocolExtension base class, which is implemented by a protocol adapter that has to keep state relating to actor events.

In accordance with an embodiment, the actor container does not communicate externally directly. External connectivity can be provided using distributed caches in the storage service, which in turn communicate throughout the cluster, through the use of Oracle Coherence for distributed caching. It also provides mechanisms for actors to send and receive events that may be targeted for other servers in the cluster, by exposing APIs that maps to the Event Broker component. The actor container maintains information about actors and their state in caches. The information kept is used to restore actor instances to the state they were in before a server crash. When the actor container detects a server crash, all the actors that were running on that server are instantiated on other servers in the cluster and brought to running state by invoking the revive lifecycle method with event registrations, timers and event channels that were open before the crash. When the revive method is invoked, the actor must associate new event handlers for these and continue handling traffic. This causes the actor container to re-register the event and timer handlers with the event broker on the local server. This is important because the event broker drops event registrations and timers performed on a JVM when the JVM shuts down or crashes, as they are of no use to the event broker without the event handler.

In accordance with an embodiment, when failover occurs, the actor container re-registers all of its timers with the event broker as the event broker does not inherently support migration of timers. The actor framework stores persistently, among other things, information about timer registrations persistently (in ActorAppTimerReceipt). This information can include delay information, the initial delay from timer was scheduled until it should fire, as passed to ActorEventBroker? API, and period information, set to >0 to indicate a recurring timer. The timer will fire at recurring intervals as per the ActorEventBroker? API. Additionally, schedule information (origTimeSchedule), the time for which the timer was scheduled, can also be stored persistently. When a timer is migrated, the timer is rescheduled. Depending on the circumstances of the migration, different algorithms can be used to compute the reschedule time. For example, an algorithm for computing reschedule time on new node is shown below:

Case 1: One-Shot Timer Scheduled Through ActorEventBroker Method

In this case, it is determined whether the timer has expired, i.e. origTimeScheduled+delay<now. If true, the new timer can be scheduled with delay 0, otherwise it is scheduled for the remaining period (origTimeScheduled+delay)−now. In this case, there is very little risk of "forgetting" to schedule the timer since it is stored persistently. There is also little chance of scheduling it twice, as if the timer was already scheduled, it would have been removed—consistency depends on transaction commit atomicity.

Case 2: Periodic Timers Scheduled Through ActorEventBroker Method

In the case of periodic timers it becomes trickier to figure out whether the correct number of timer event handler invocations has been performed since this cannot be based purely on the existence of the timer. A persistent counter can be updated for the number of timer invocations for each timer invocation to solve this consistently. Alternatively, a more approximate approach can be used in which the time window when migration happens is shortened. If the initial interval has not expired (origTimeScheduled+delay<=now), then the timer can be scheduled with delay=(origTimeScheduled+delay)−now and the specified period. Otherwise, it can be assumed that the timer has already fired before migration (ignoring any time it may have taken to do the failover), and the timer can be scheduled to fire with a delay equal to the next time a periodic timer should occur in absolute terms, using origTimeScheduled, delay, and period for calculation.

Figure 4:
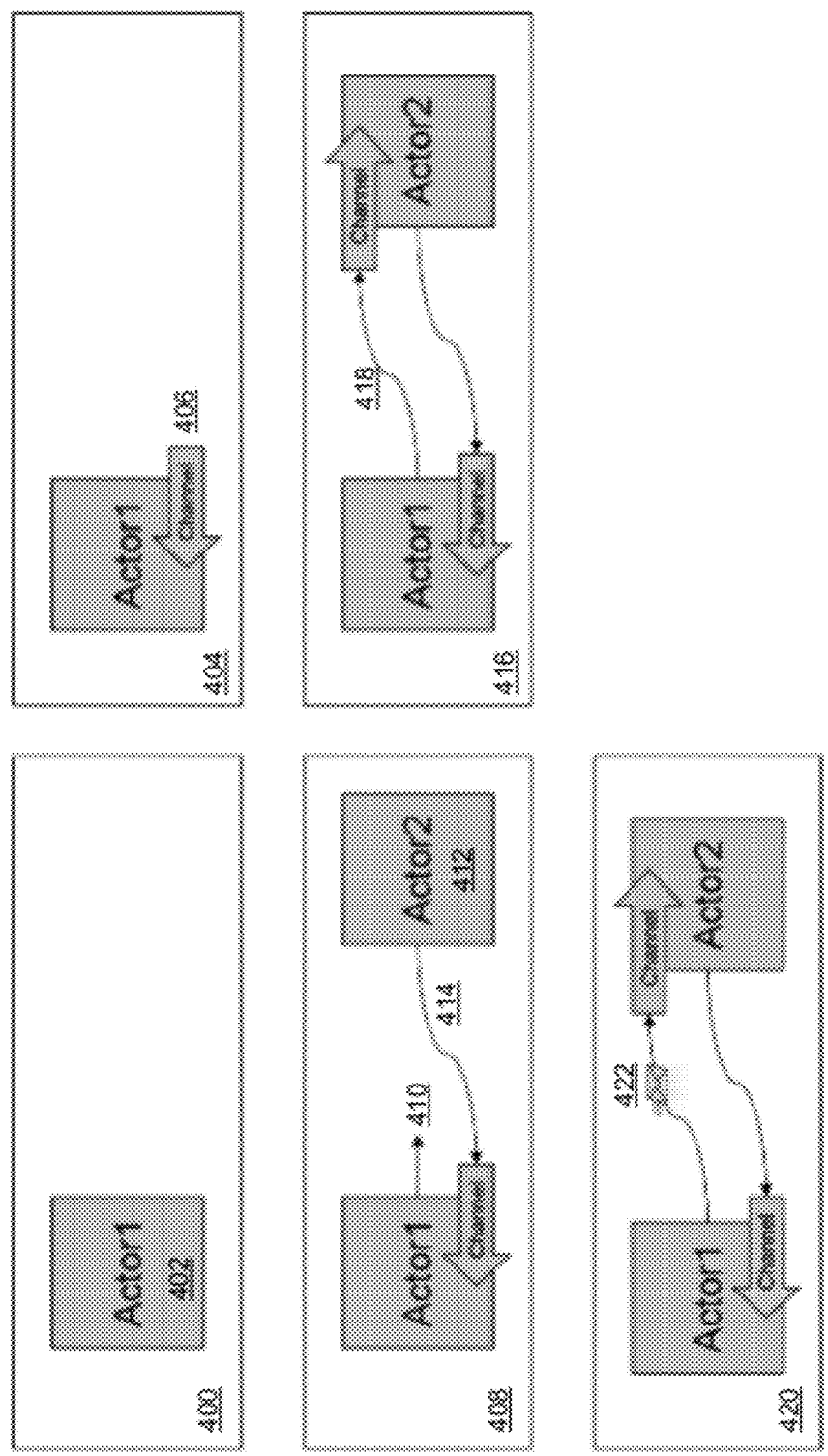
FIG. 4 shows an illustration of actor creation, in accordance with an embodiment.

Reducing failover window for lost timers can be provided through adjusting interval for cluster heartbeat, through parameter heartbeat-milliseconds, which has an allowed range from 100 ms to 1 minute and a default value of one second. Another improvement to failover time can be provided by adjusting the tcp-ring-listener maximum-socket-closed-exceptions FIG. 4 shows an illustration of actor creation, in accordance with an embodiment. In FIG. 4, box 400 shows Actor1 402 before a channel is invoked to create a new peer actor. At box 404, Actor1 invokes a method, such as the createPeerWithChannel( ) method, to open an event channel 406 and get a port to be forwarded to Actor2. At box 408, Actor1 requests 410 creation of Actor2 412. Actor1 receives 414 a channel reference to the channel that Actor2 opens. At box 416, Actor2 is instantiated and receives 418 a channel reference to Actor1 and the port to open. Actor2 can then be started and resumed by the container and, during the resume, opens the channel using the port. By doing this, Actor1 gives Actor2 a channel back to itself, and requests Actor2 to open a channel that Actor1 can use to publish events to Actor2. At box 420, Actor1 publishes an event 422 to Actor2's channel.

Error Handling

As described above, error handling is managed by the Actor Container. The following features are provided by the actor container.

Actor Transactions

In accordance with an embodiment, if an actor throws an exception from an event processing or lifecycle method or an actor transaction fails to commit the changes an actor has requested, the actor can either be forced shut down or an attempt can be made to roll back the transaction while keeping the actor alive. The error handling option can be specified per actor class in actor.xml. The default behavior is to roll back for bootstrap actors and to shut down for all other actors, unless explicitly overridden in actor.xml.

Overload Protection

Overload protection in the actor container can include placing limits on queue and thread pool size. Table 1 shows a plurality of limits which can be set by default to protect from overload, in accordance with an embodiment.

TABLE 1

| | |
|---|---|
| Actor event/lifecycle work manager thread pool | 0 . . . 1 threads per actor |
| Actor event/lifecycle work manager queue | A maximum of 10 (normal actor) or 100 (boots trap actor) pending events (configurable per actor class in actor.xml) |
| Actor timer work manager thread pool | 0 . . . 1 threads per actor |
| Actor timer work manager queue | A maximum of 10 pending events (configurable per actor class in actor.xml) |
| Shared work manager thread pool | Max 100 threads |
| Shared work manager queue | Max ~65 k entries |
| Coherence actor cache service | 100 threads |
| Coherence task timeout | Default Coherence task timeout (65 seconds in production mode) |

Storage

Storage service usage: In accordance with an embodiment, the actor container can use internal functions of the storage service, Coherence storage provider and even the Coherence bundle directly. The container can use three groups of stores/caches, and within each group there can be multiple stores/caches.

Actor name→ID mapping: Mapping from actor name to an actor ID.

Actor registry: A registry of actor configuration. This is the main store that is used to control where actor instances are started, and to collocate the actors with their store data. There is one registry store per application.

Actor stores: The actors' store caches. All actors' store data end up in the same caches if they have the same name, but each actor has its own view of the cache that only allows it to access its own store data. The keys in these stores are associated with the Actor registry keys to ensure collocation.

Actor state: Includes information of each actors event registrations, timers, and actor stores used.

Actor protocol extension stores: This feature can include actor protocol extension store caches.

Platform

In accordance with various embodiments, the application server platform provides individual stages organized by start level. In case of failure, a trigger is initiated to roll back to previous stable state.

The administrative piece of the application server cluster is the administration console that is used to manage the cluster (e.g. deploy bundles and managed servers). The administration console can be completely stateless and can be launched from any location at any time. In accordance with an embodiment, only one admin console can perform a configuration change at a time.

Figure 5:
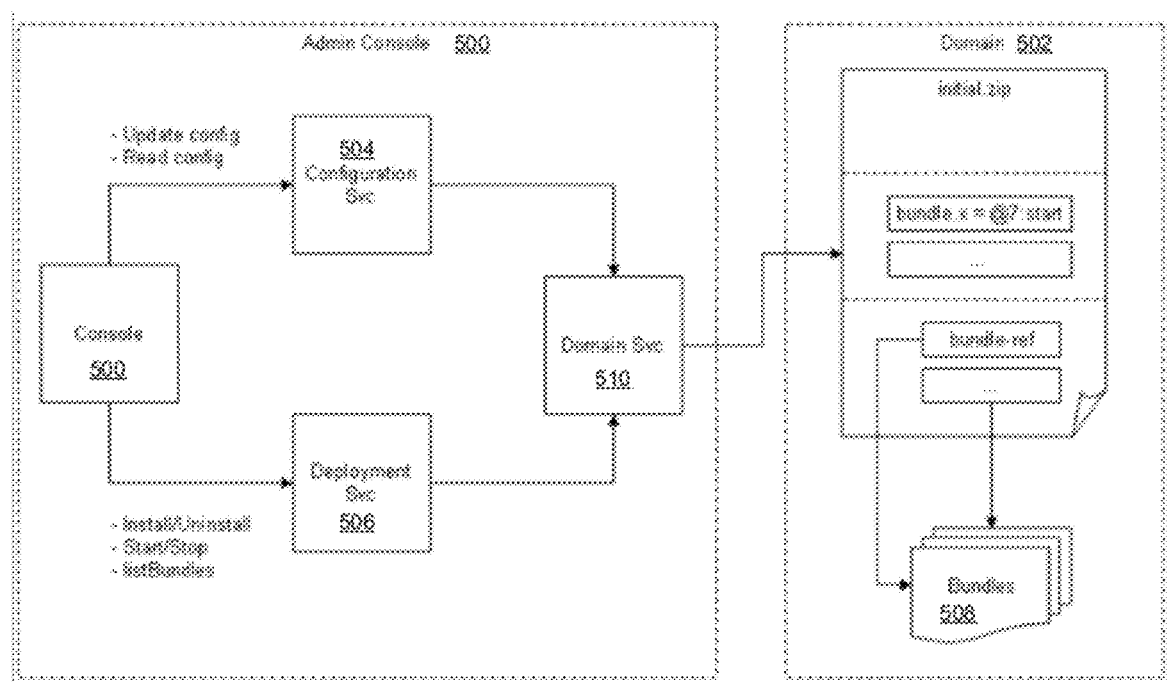
FIG. 5 is an illustration of the administration console in accordance with various embodiments of the invention.

FIG. 5 is an illustration of the administration console in accordance with various embodiments of the invention. As illustrated, the administration (admin) console 500 can be used to manage a domain 502. The admin console can read and update configuration information for the domain with configuration service 504. In addition, the console can install/uninstall, start/stop and list all bundles in the domain with the deployment service 506. The domain can include the bundles 508.

Figure 6:
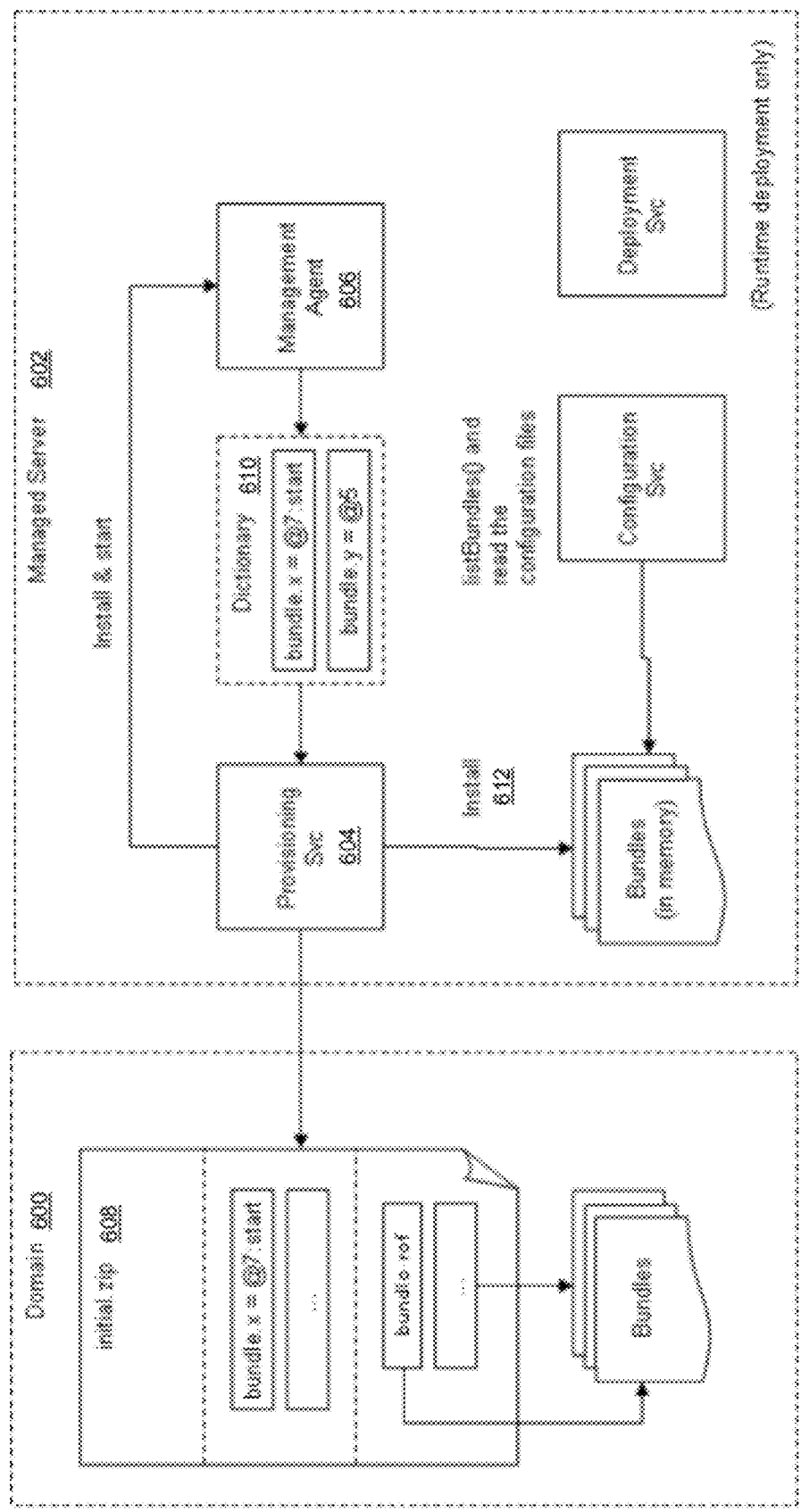
FIG. 6 shows an overview of the components of a platform for managed servers, in accordance with an embodiment.

Domain handling is controlled by the Domain Service 510. The domain service reads and writes information from and to the domain. Information means, in this context, the bundles to be deployed, the configuration and properties for these bundles and any properties for the domain itself. The Domain Service hides the actual structure of the domain on the disk to the services using it. As shown in FIG. 5, this component is available as part of the admin console. In accordance with an embodiment, the domain service provides the ability to read and write data to the domain. The domain service is operable to read, write and/or remove bundles from the domain. It is further operable to read and/or write bundle properties and resources to the domain, as well as list available bundles in the domain. As shown in FIG. 6, the domain service is used by the configuration service and the deployment service in the admin console. In accordance with an embodiment, the system can be limited such that the domain service is the only service allowed to read or write to the domain.

FIG. 6 shows an overview of the components of a platform for managed servers, in accordance with an embodiment. As shown in FIG. 6, a domain 600 can include one or more managed servers 602, which can be organized in a cluster. The managed servers can include a Provisioning Service 604 and a Management Agent 606, used for platform startup. The Provisioning Service can include a provisioning zip file (e.g., initial.zip 608), which includes a list of bundles and properties, and can install the bundles included in the provisioning zip file and start the Management Agent. The Management Agent can startup the bundles that have been installed by the Provisioning Service by transitioning the start level of the OSGi platform and handling any errors during these transitions. In accordance with an embodiment, the Provisioning Service and Management Agent are available in the Managed Servers only.

In accordance with an embodiment, the provisioning zip file can be used by the managed servers at startup to determine which bundles to install and/or start, and in which order those bundles should be installed and/or started. In addition, the provisioning zip file can include properties for the platform. In accordance with an embodiment, this file is stored in a location accessible by all of the managed servers, such as a shared file system or hosted on a separate server. The provisioning zip file is read only by the Provisioning Service. Additionally, the Admin Console can manipulate the content of this file using the Domain Service. The configuration for each bundle can be stored in the bundle itself (e.g. in a configuration file such as config.xml or config.xsd). Also, properties for each bundle can be stored in the provisioning zip file (e.g. start level, status, etc.).

The admin console can be used to create the provisioning zip file based on the modules available in the domain and a set of default properties. The modules available in the domain can be used to create a list of bundles, and domain properties (e.g. list of managed servers, ADMIN/RUNNING level) can be determined from the set of default properties. At runtime, the Domain Service can write new bundles to the domain.

The Provisioning Service can perform one or more of the following tasks. The provisioning service can read the content of the initial.zip file. It can store each entry of type "text" or "binary" in a Provisioning Dictionary 610. Additionally, it can install 612 each entry of type "bundle" or "bundle-ref" in the platform. In accordance with an embodiment, the entry "provisioning.start.bundle" indicates which bundle should be started (usually, it is the Management Agent).

The Management Agent is responsible for transitioning the framework through the start levels. It is also the contact point for Remote Management (via the admin console). The Management Agent can execute the following operations based on information provided by the Provisioning Dictionary. The management agent can assign a start level to each bundle as specified in the entry "bundles.properties". The management agent can also transition to ADMIN, shutdown on error (listen for OSGi FW error events), transition to RUNNING, and/or go to ADMIN on error. In addition, the Management Agent can be used to graceful suspend (Server-LifecycleListener), allow a server to be started in admin, and expose Mbeans for start/stop/admin/running transitions.

Managed Server Startup Sequence

Figure 7:
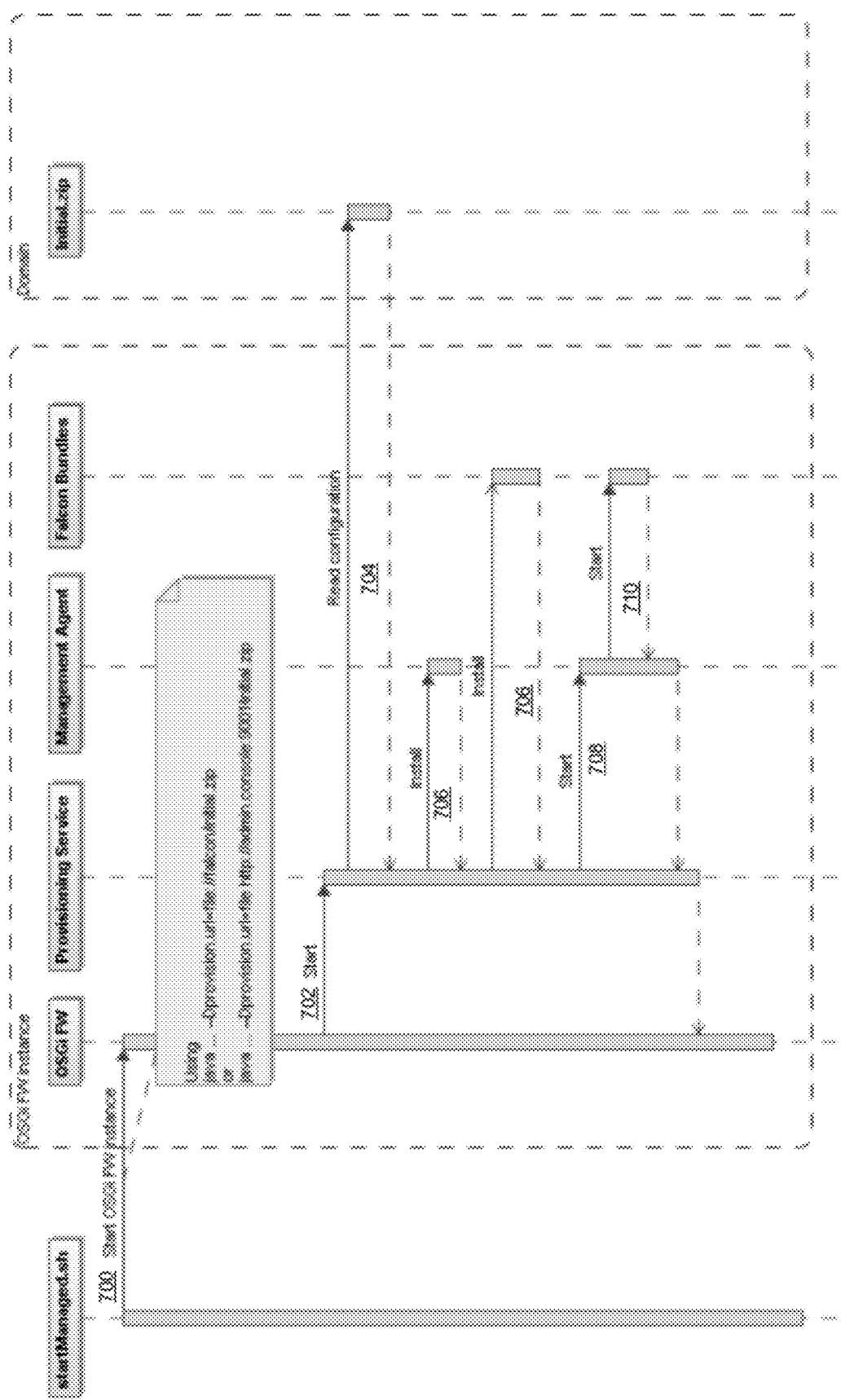
FIG. 7 shows a workflow diagram of the start up of a managed server, in accordance with an embodiment.

FIG. 7 shows a workflow diagram of the start up of a managed server, in accordance with an embodiment. At 700, the OSGi FW instance is started by the startManaged.sh-script. The URL of the initial.zip file is provided. At 702, the Provisioning Service is started. At 704, the provisioning service reads the configuration information from the initial-.zip file and loads the content of the initial.zip. At 706, the Provisioning Service installs the bundles (CE, core service, PA and applications) specified in the initial.zip in the OSGi FW. All the bundles will be treated the same way during startup. At 708, the Provisioning Service starts the Management Agent as specified in initial.zip. At 710, the Management Agent starts each bundle according to the order specified in initial.zip and handles any errors.

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for providing an application server system for telecom-based applications, said system comprising:
   a plurality of computers each comprising a computer readable medium and a processor; and
   a plurality of application servers, each executing on one of the plurality of computers, wherein each application server comprises:
      a first protocol adapter implementing input and output operations of first telecom-based communications having a first protocol;
      a second protocol adapter implementing input and output operations of second telecom-based communications having a second protocol different than the first protocol;
      an event broker operatively coupled with the first and second protocol adapters, the event broker performing a mapping between the first and second telecom-based communications having the first and second protocols and a plurality of protocol-independent and asynchronous events; and
      an actor container that manages and provides lifecycle and runtime properties for application classes that are executed as a plurality of actors in the application server, the plurality of actors:
         subscribing to the plurality of protocol-independent and asynchronous events of the event broker;
         performing operations on the plurality of protocol-independent and asynchronous events of the event broker; and
         publishing to the event broker one or more result events comprising information relating to the performing the operations on the plurality of protocol-independent and asynchronous events;
      wherein the actor container of each application server of the plurality of application servers manages event transactions of the application classes that are executed as the plurality of actors in the each application server by performing all storage operations as part of an event transaction that spans each event handler invocation.

2. The system of claim 1, wherein:
the actor container of each application server implements store collocation wherein each actor of the plurality of actors is always collocated on an application server together with store data associated with said each actor; and
the actor container of each application server implements actor isolation, wherein only an actor owning a store data can access the store data.

3. The system of claim 1, wherein:
the actor container of each application server provides actor migration between first and second application servers of the plurality of application servers, wherein an actor, including a set of timers associated with said actor, are migrated from a first application server to a second application server.

4. The system of claim 1, wherein the actor container of each application server provides linked actors, and wherein a hint is provided to the container that the container should attempt to link a selected actor with a first actor that requests the selected actor to be created.

5. The system of claim 1, further comprising an event channel created by an actor of the plurality of actors, wherein application events are selectively sent between the plurality of actors by using the event channel.

6. The system of claim 5, wherein a reference to an event channel is selectively passed to multiple actors of the plurality of actors, such that said multiple actors can send events to a channel receiver associated with the event channel.

7. The system of claim 1, wherein the actor container of each application server manages the event transactions of the application classes that are executed in the actor container of the each application server by either one of committing or rolling back the event transactions.

8. The system of claim 7, wherein the actor container of each application server manages the event transactions of the application classes that are executed in the actor container of the each application server by either one of committing or rolling back the event transactions only after event processing of the event transactions complete or fail.

9. The system of claim 1, wherein the actor container of each application server provides a runtime environment and one or more application programming interfaces (APIs) for application code that give application classes and services exposed through the APIs in an actor model environment of the each application server runtime properties associated with the actor model.

10. The system of claim 1, wherein the actor container of each application server of the plurality of application servers:
maintains separate runtime environments for different applications;
defines application boundaries by using a name of a bundle that requests an initial actor to be created; and
maintains separate actor manager instances for each such bundle, whereby the actor container provides isolation between different applications and recognizes when the same application is starting on another application server in the plurality of application servers.

11. The system of claim 1, wherein the actor container of each application server of the plurality of application servers manages and provides lifecycle and runtime properties for a selected application class of the application classes that satisfy at least one condition of:

the selected application class implements an actor interface and is instantiated by the actor container and is only referenced by the actor container;
the selected application class implements an actor event handler interface and is referenced only by the actor or event registrations executed by the actor that instantiated the handler; or
the selected application class is instantiated and referenced only by an actor instantiating the application class.

12. The system of claim 1, wherein:
the actor container of each application server of the plurality of application servers creates one or more initial actors for an application by creating in the actor container a set of statically declared initial actors for the application to bootstrap intro responsive to: the application declaring that the application expects the actor container to create one or more initial actors for the application, and the application defining the set of statically declared initial actors; and
the set of statically declared initial actors for the application to bootstrap into are instantiated once per application throughout a first cluster comprising a selected application server.

13. The system of claim 12, wherein:
the application bootstrapped into the actor container creates, by the actor container of the application server, one or more new actors in the actor container.

14. A method of providing actor model environment support for associated telecom-based applications, the method comprising:
providing a plurality of application servers each executing on a computer comprising a computer readable medium and a processor;
implementing input and output operations, by a first protocol adapter of each application server, of first telecom-based communications having a first protocol;
implementing input and output operations, by a second protocol adapter of each application server, of second telecom-based communications having a second protocol different than the first protocol;
performing a mapping, by an event broker of each application server and operatively coupled with the first and second protocol adapters, between the first and second telecom-based communications having the first and second protocols and a plurality of protocol-independent and asynchronous events; and
managing and providing lifecycle and runtime properties, by an actor container of each application server, for application classes that are executed as a plurality of actors in the application server, each of the plurality of actors:
subscribing to the plurality of protocol-independent and asynchronous events of the event broker;
performing operations on the plurality of protocol-independent and asynchronous events of the event broker; and
publishing to the event broker one or more result events comprising information relating to the performing the operations on the plurality of protocol-independent and asynchronous events,
wherein the actor container of each application server of the plurality of application servers manages event transactions of the application classes that are executed as the plurality of actors in the each application server by performing all storage operations as part of an event transaction that spans each event handler invocation.

15. The method of claim 14, further comprising:
implementing, by the actor container of the application server, store collocation wherein each actor instance is always collocated on a server together with store data associated with the each actor instance; and
implementing, by the actor container of the application server, actor isolation, wherein only an actor owning a store data can access the store data.

16. The method of claim 14, further comprising:
providing, by the actor container of the application server, a runtime environment and one or more application programming interfaces (APIs) for application code that give application classes and services exposed through the APIs in an actor model environment of the application server runtime properties associated with the actor model.

17. The method of claim 14, further comprising:
maintaining by the actor container of the application server separate runtime environments for different applications;
defining by the actor container of the application server application boundaries by using a name of a bundle that requests an initial actor to be created; and
maintaining by the actor container of the application server separate actor manager instances for each such bundle, whereby the actor container provides isolation between different applications and recognizes when the same application is starting on another server in the first cluster.

18. The method of claim 14, wherein:
the application bootstrapped into the actor container creates, by the actor container of the application server, one or more new actors in the actor container.

19. A non-transitory machine readable storage medium having instructions stored thereon for providing an actor model environment support application server system of a plurality of application servers executing in an associated telecom-based system, which instructions, when executed, cause the plurality of application servers to perform steps comprising:
implementing input and output operations, by a first protocol adapter of each application server, of first telecom-based communications having a first protocol;
implementing input and output operations, by a second protocol adapter of each application server, of second telecom-based communications having a second protocol different than the first protocol;
performing a mapping, by an event broker operatively coupled with the first and second protocol adapters of each application server, between the first and second telecom-based communications having the first and second protocols and a plurality of protocol-independent and asynchronous events; and
managing and providing lifecycle and runtime properties, by an actor container of each application server, for application classes that are executed as a plurality of actors in the application server, each of the plurality of actors:
subscribing to the plurality of protocol-independent and asynchronous events of the event broker;
performing operations on the plurality of protocol-independent and asynchronous events of the event broker; and
publishing to the event broker one or more result events comprising information relating to the performing the operations on the plurality of protocol-independent and asynchronous events,
wherein the actor container of each application server of the plurality of application servers manages event transactions of the application classes that are executed as the plurality of actors in the each application server by performing all storage operations as part of an event transaction that spans each event handler invocation.

20. The non-transitory machine readable storage medium of claim 19, further comprising:
creating, by the actor container of each application server of the plurality of application servers, one or more initial actors for an application by creating in the actor container a set of statically declared initial actors for the application to bootstrap intro responsive to: the application declaring that the application expects the actor container to create one or more initial actors for the application, and the application defining the set of statically declared initial actors; and
instantiating the set of statically declared initial actors for the application to bootstrap into once per application throughout a first cluster comprising a selected application server.

* * * * *